Sept. 21, 1954 G. MARULLO ET AL 2,689,783
CONTINUOUS PROCESS FOR PURIFYING RAW SULFUR
Filed Feb. 8, 1951 2 Sheets-Sheet 1

INVENTORS
Gerlando Marullo
Domenico Maragliano
BY
*Knight Bros*
ATTORNEYS

Sept. 21, 1954 G. MARULLO ET AL 2,689,783
CONTINUOUS PROCESS FOR PURIFYING RAW SULFUR
Filed Feb. 8, 1951 2 Sheets-Sheet 2

INVENTORS
Gerlando Marullo
Domenico Maragliano
BY
ATTORNEYS

Patented Sept. 21, 1954

2,689,783

UNITED STATES PATENT OFFICE 2,689,783

CONTINUOUS PROCESS FOR PURIFYING RAW SULFUR

Gerlando Marullo and Domenico Maragliano, Milan, Italy, assignors to Montecatini Società Generale per l'Industria Mineraria e Chimica Anonima, a corporation of Italy Application February 8, 1951, Serial No. 210,024

Claims priority, application Italy March 28, 1950

1 Claim. (Cl. 23—224)

Among the various processes proposed for purifying raw sulphur, which is generally contaminated by various hydrocarbons, the method which comprises essentially carbonizing the impurities by putting molten sulphur into contact with sulphur trioxide, has proved to be particularly effective.

To carry out said process, it has been proposed to make sulphur trioxide or gases containing it bubble in the mass of raw sulphur brought to the molten condition. In practice, however, this method offers some disadvantages, among which the following should be specially noted:

(a) The compression of the sulphur trioxide, or of the gas containing it, is necessary in order to overcome the pressure head of molten sulphur;

(b) The discontinuity of the process with consequent bad utilization of sulphur trioxide, which at the beginning is all reduced to sulphur dioxide, while growing portions thereof remain unaltered as the operation progresses, thus constituting a loss.

The disadvantages mentioned above are overcome now with the continuous process according to the present invention for the refining of molten raw sulphur by means of sulphur trioxide, characterized in that gases containing sulphur trioxide and raw sulphur in molten condition are made to circulate in countercurrent flow relationship, said sulphur being provided in the form of continuously renewed thin layers arranged in planes substantially normal to the direction of gas flow.

It is a further object of the invention to provide a device for carrying out said process, essentially constituted by a horizontal drum provided inside with movable members suited to obtain the working conditions as required by said process.

The invention will now be described in detail with reference to the accompanying drawings, wherein one of the preferred embodiments of the invention is diagrammatically represented by way of example and not by way of limitation, as follows.

The apparatus in its essential lines is constituted by a metal drum 1, provided in its lower portion, over it whole length, with a jacket 2, which extends about as far as the middle line, being provided with joints 3 and 4 for the circulation of the heating fluid. The two heads of the drum 1 are provided in turn with conduits 5 and 6 respectively for the introduction and discharge of the gas containing $SO_3$, and 7 and 8 respectively for the introduction and discharge of the molten sulphur.

Figure 2:
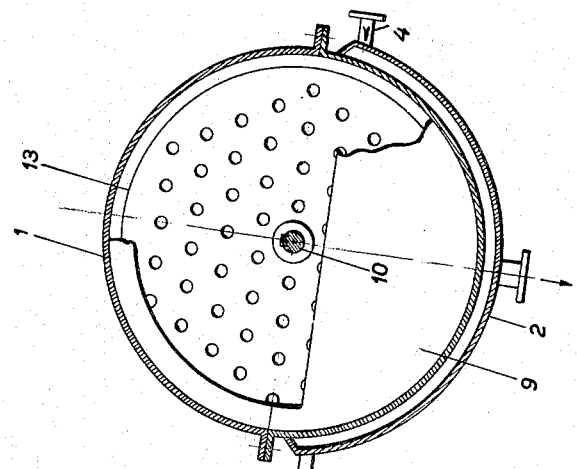
Fig. 2 is a transverse view, partly in section, along the line I—I of Fig. 1.
Figure 1:
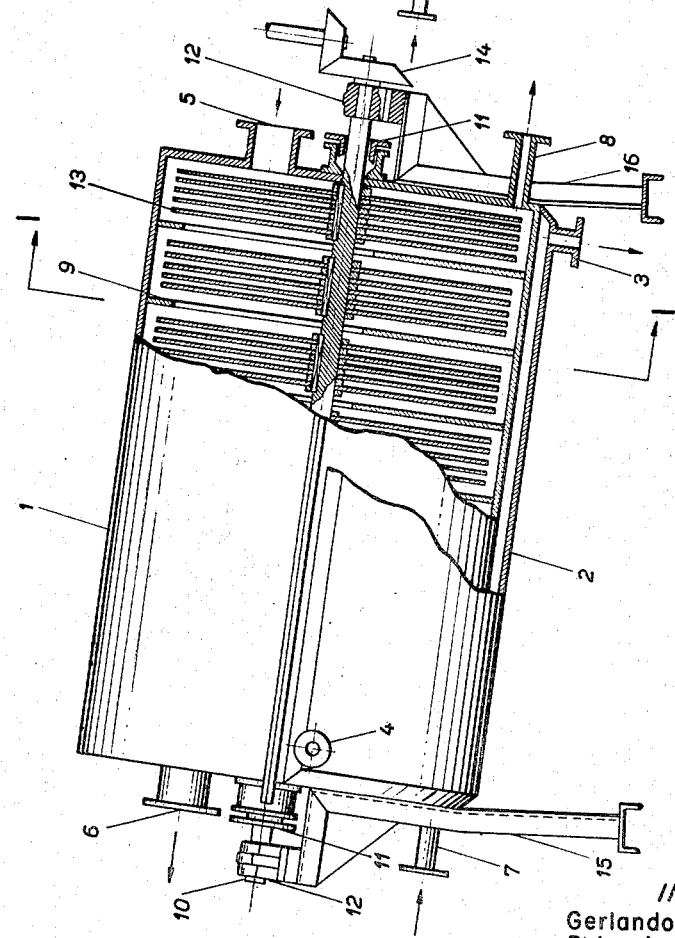
Fig. 1 is a longitudinal view, partly in section, of the apparatus according to the invention.

The drum 1 is divided inside into a number of chambers by baffles 9, which in their lower part extend nearly up to the height of the middle axis, forming an equal number of liquid-proof pockets, while in the upper part (Fig. 2) they are reduced to a simple annular border, so that in the upper half of the drum there remains free a wide central space by way of which the chambers are in communication with one another.

The drum 1 is passed through over its whole length by a shaft 10 emerging from the heads through stuffing boxes 11 and is supported in external bearings 12 of supports provided for this purpose.

On the shaft 10 there are fitted a number of perforated metal discs 13 conveniently arranged and spaced from one another in such a manner that the holes of two contiguous discs are staggered. An external gearing serves to drive the rotary shaft 10 together with its perforated discs 13, by means of a drive motor not shown in the drawings.

Two supports of different height, 15 and 16 respectively, keep the apparatus in a position inclined with respect to the horizontal.

It is obvious that the number of internal chambers, and consequently the length of the drum, as well as the number of perforated discs, may vary in accordance with the cases of application as well as with factors such as required output per hour, percentage of impurities in the raw material and so on.

The heating jacket 2 has the task of keeping the mass of sulphur in fluid condition, in particular during possible interruptions of operation, and it is limited to the lower half of the drum, because in the upper half there are already hot gases circulating.

The operation of the apparatus is self-evident. Molten sulphur enters at 7 and leaves at 8 after successively filling the various pockets existing between the baffles 9, while the gas containing $SO_3$ enters at 5 and leaves at 6 after skimming over the discs 13 and passing from one to the other mainly through their holes, which are conveniently staggered in the contiguous discs. The discs turn with a good part of their surface immersed in the molten sulphur, leaving it coated with a thin film of molten sulphur, which thus is continually renewed and comes in intimate contact with the gaseous current containing SO₃, which as said passes in the contrary direction through the upper portion of the drum. Thus the countercurrent principle is applied in the apparatus in such a manner that sulphur progressively poorer and poorer of organic substances comes to contact a gas richer and richer of SO₃, which enhances the effectivity of purification.

The inclined position of the apparatus, together with its inner baffles forming pockets for the fluid mass, ensures that the latter, on advancing in the apparatus and, therefore, with the progress of purification, may not be contaminated again with the impurities present initially.

Figure 3:
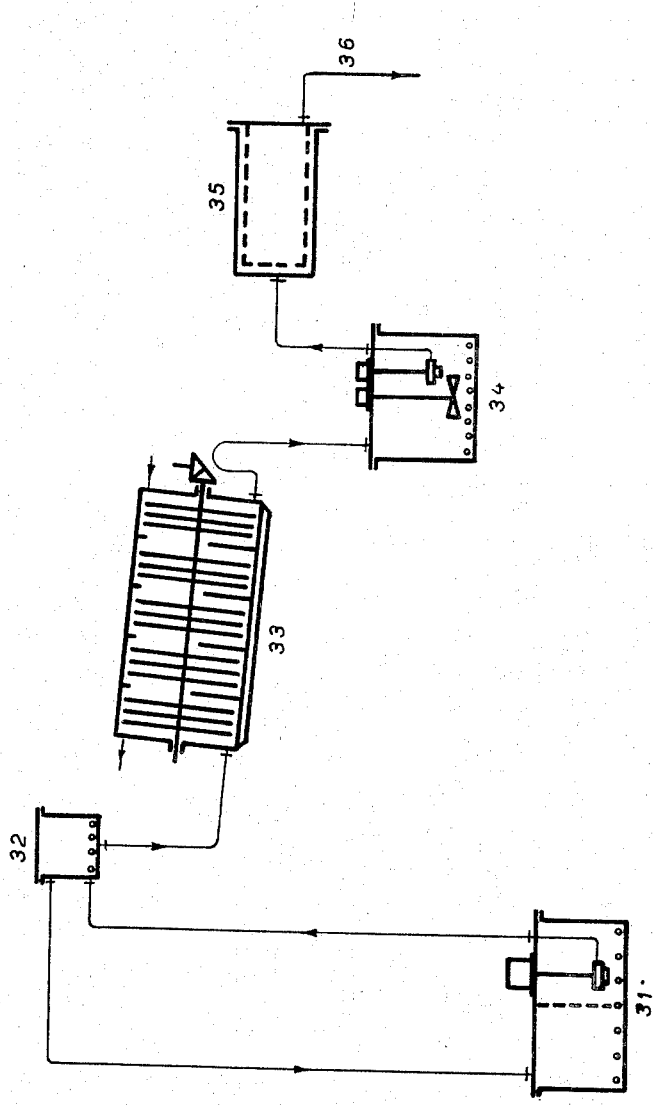
Fig. 3 is a flow sheet of a plant for the purification of sulphur with the process according to the invention, embodying an apparatus according to Fig. 1.

In Fig. 3 there is schematically diagrammed the layout of a plant for the refining of sulphur with the process and apparatus according to the invention. Raw sulphur is melted at 31 and is conveyed by a pump to the measuring device 32, which drops it into the apparatus 33 operated as described hereinbefore. After refining, sulphur passes into the vessel 34, where a filtering aid is added if needed, and then it is filtered in the filter 35. The filtered sulphur leaving at 36 is then solidified according to need, or even conveyed to combustion in a plant for the manufacture of sulphuric acid. If this is a contact process plant, the apparatus hereinbefore described finds special and advantageous application, since the pressure drop existing after and before the catalysis chamber may be utilized for the circulation of the gas containing SO₃.

Of course, an embodiment of the apparatus in practice may comprise variants and modifications without departing from the scope of the invention.

Having now described our invention, what we claim is:

In a process for refining fused raw sulphur by means of sulphur trioxide, the step which comprises passing continuously by gravity molten raw sulphur in countercurrent flow relationship with gases containing sulphur trioxide and contacting said gases with said molten sulphur in a succession of thin layers, provided in planes substantially normal to the gas flow, continuously renewing said thin sulphur layers, and collecting and drawing off the molten sulphur thus treated.

References Cited in the file of this patent

UNITED STATES PATENTS

| Number | Name | Date |
| --- | --- | --- |
| 847,869 | White | Mar. 19, 1907 |
| 1,031,160 | Bailey | July 2, 1912 |
| 1,967,874 | Dunn | July 24, 1934 |
| 2,353,959 | Hills | July 18, 1944 |
| 2,424,336 | Sieron | July 22, 1947 |
| 2,433,552 | Haney et al. | Dec. 30, 1947 |
| 2,554,109 | Langhurst | May 22, 1951 |
| 2,626,889 | Carney | Jan. 27, 1953 |

FOREIGN PATENTS

| Number | Country | Date |
| --- | --- | --- |
| 314,697 | Great Britain | July 4, 1929 |
| 350,574 | Great Britain | June 15, 1931 |
| 385,352 | Great Britain | Dec. 29, 1932 |
| 637,528 | Germany | Oct. 30, 1936 |